No. 781,067. PATENTED JAN. 31, 1905.
E. R. HEWITT.
TURNBUCKLE LOCK.
APPLICATION FILED MAR. 23, 1904.

Witnesses
Inventor
Edward R. Hewitt
By his Attorney

No. 781,067.

Patented January 31, 1905.

UNITED STATES PATENT OFFICE.

EDWARD R. HEWITT, OF NEW YORK, N. Y.

TURNBUCKLE-LOCK.

SPECIFICATION forming part of Letters Patent No. 781,067, dated January 31, 1905.

Application filed March 23, 1904. Serial No. 199,661.

*To all whom it may concern:*

Be it known that I, EDWARD R. HEWITT, a citizen of the United States, residing at the city of New York, in the borough of Manhattan and State of New York, have invented certain new and useful Improvements in Turnbuckle-Locks, of which the following is a full, clear, and exact description.

This invention relates, primarily, to turnbuckles and their adjuncts; and its principal object is to connect two members by means of a turnbuckle, so as to form a link which shall be capable while in service of repeated adjustment as to length, but which shall not be liable to become accidentally altered in length. A link of this nature is adapted for use in many ways—as, for instance, in a toggle forming part of a clutch mechanism—whereby the clutch may be set up to compensate for wear, by lengthening the link from time to time as required.

Figure 1:
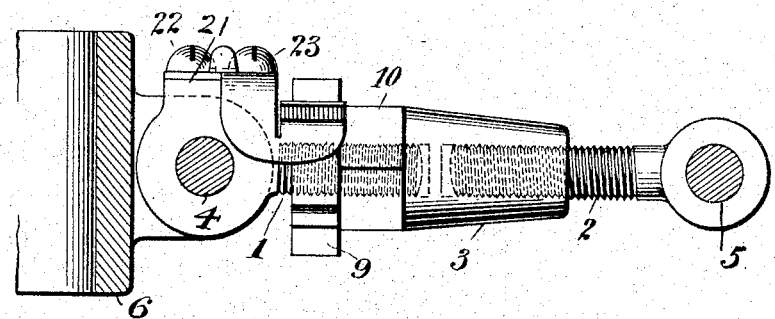
Figure 2:
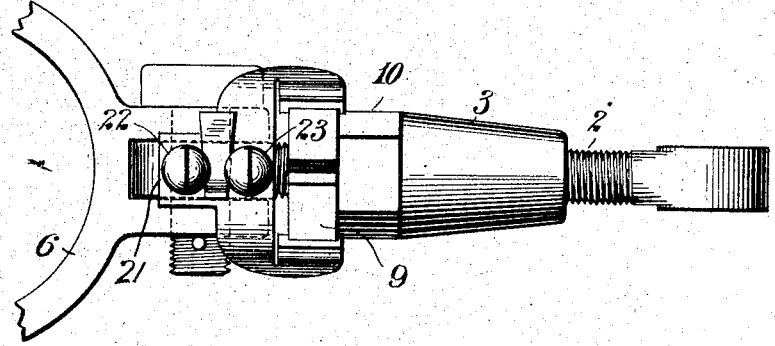
Figure 3:
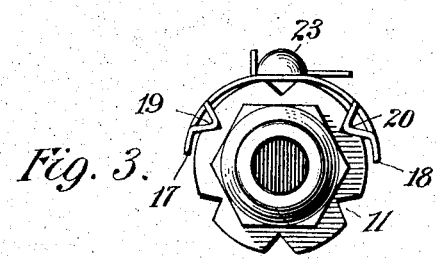
Figure 5:
Figure 4:
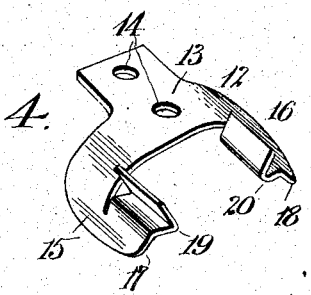

In the accompanying drawings, Figure 1 is a side view, and Fig. 2 a plan, of a link made according to my invention and forming part of a toggle. Fig. 3 is a cross-section showing an end view of the turnbuckle. Fig. 4 is a perspective of a ramified or forked spring-plate formed with detents to control the turnbuckle. Fig. 5 is a perspective of a wedging-key bent up at the end from dotted-line to full-line position, and Fig. 6 shows end views of a pair of screws whose heads are formed with convergent keyways.

Stems or rods 1 and 2 are tapped into a turnbuckle 3 to form a link, the stems being provided at their outer ends with pivots or pivot-holes at 4 and 5 and being provided with right and left hand threads. By means of the pivot 4 the link may be connected to a collar 6, which may be moved along a rod or shaft (not shown) to impart a thrust to the link whose opposite end is adapted to move in a direction longitudinal of the link to actuate, for instance, a clutch or other device. It will be understood that neither stem needs to rotate, while the turnbuckle may be rotated for lengthening or shortening the link, as required. The turnbuckle is formed at one end with a flange 9 and between its ends with a hexagon or other wrench or spanner hold 10. The flange is formed with a series of peripheral notches or teeth 11 for coaction with a spring-detent 12. As seen at Fig. 4, the latter is in the form of a spring-plate and comprises a base portion 13, provided with perforations 14 and arms 15 16 ramifying or forking from said base portion and having reflex ends 17 18 for rendering the arms sufficiently flexible, said reflex ends being formed with V-shape teeth 19 20, which simultaneously engage two of the notches 11 in the turnbuckle-flange 9 to prevent the turnbuckle from accidental rotation. It will be noted that said teeth 19 20 extend longitudinally of the turnbuckle and are of such width as to permit adjustment of the turnbuckle to a substantial extent in longitudinal direction without becoming disengaged from the teeth. Said spring-detent is secured upon a head 21, formed upon the stem 1 by means of a pair of screws 22 23, passing through the holes 14 and tapped into said head, the arms 15 16 curving downwardly from said head, as seen at Figs. 1 and 3.

Figure 6:
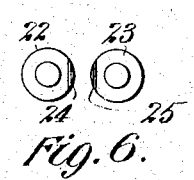

In assembling the device the screws after being driven home are marked and then withdrawn, and keyways 24 25 are then cut in the under sides of the heads, Fig. 6. The screws are then finally put in position, the keyways being opposite and convergent, and a wedge-shape key 26 driven between the screws with its edges in engagement with the keyways, whereby the loosening of the screws is prevented. The smaller end of the wedge is then bent up, as at 27, sufficiently to prevent the wedge from becoming withdrawn. Thus it will be seen that it is made impossible for any part of the device to work loose, and hence the same is well adapted for use upon automobiles and other machines subjected to severe jarring. The turnbuckle may be turned in either direction to effect any adjustment desired, the spring-detents yielding sufficiently for this purpose.

Variations may be resorted to within the scope of my invention, and portions of my improvements may be used without others.

Having described my invention, I claim—

1. A link comprising two stems tapped into a turnbuckle, and a yielding detent for the turnbuckle secured to one of said stems.

2. A link comprising two stems and a turnbuckle, the inner ends of said stems being tapped into said turnbuckle, and their outer ends being provided with pivots, a series of detent-notches being provided upon said turnbuckle, and a spring-detent fixed upon the pivot end of one of said stems and engageable with said notches.

3. The combination with two stems and a turnbuckle connecting them, of a spring-detent secured to one of the stems, said turnbuckle being provided at one end with a series of detent-engaging portions, and being also provided between its ends with a hold for a wrench.

4. The combination with a threaded stem, a turnbuckle, and a stem connected by said turnbuckle to said threaded stem, of a series of peripheral notches formed upon said turnbuckle, and a spring secured upon said threaded stem and having a tooth for engaging said notches, said tooth extending longitudinally of the turnbuckle and being of such width as to permit adjustment of the turnbuckle to a substantial extent without becoming disengaged from said tooth.

5. In combination, a turnbuckle formed at one end with a notched flange and between its ends with a wrench-hold, stems tapped into said turnbuckle, and a spring-detent secured upon the outer end of one of said stems and engaging said notched flange.

6. In combination, a turnbuckle provided with notches, stems tapped into said turnbuckle, and a spring comprising a base which is fixed to one of said stems and arms ramifying from said base and having teeth for engaging said notches.

7. In combination, a turnbuckle provided with notches, stems tapped into said turnbuckle, and a spring-plate formed with a base portion which is fixed to one of said stems, and arms ramifying from said base portion, said arms having reflex ends which are shaped to engage said notches.

8. In combination, a turnbuckle provided at one end with a flange having notches and between its ends with a wrench-hold, a pair of stems tapped into the ends of said turnbuckle, said stems having pivots at their outer ends and together with said turnbuckle forming a link, and one of said stems having a head, and a spring-plate formed with a base portion which is secured by screws upon said head, and also formed with ramifying arms which curve downwardly from said head and have reflex ends which are shaped to form teeth to engage said notches, said teeth extending longitudinally of said turnbuckle.

9. In combination with two stems and a turnbuckle, one of said stems having a head, a spring-detent engaging suitable detaining portions upon said turnbuckle, screws securing said detent upon said head, and means for keying said screws.

10. In combination with two stems and a turnbuckle, one of said stems having a head, a spring having means for detaining said turnbuckle, a pair of screws securing said spring upon said head, and a key driven between said screws and holding them from turning.

11. In combination with two stems and a turnbuckle, one of said stems having a head and said turnbuckle having notches, a spring having a tooth for engaging said notches, a pair of screws for holding said spring upon said head, said screws having keyways, and a key driven between said screws and engaging said keyways.

12. In combination with two stems and a turnbuckle, one of said stems having a head and said turnbuckle having notches, a spring-plate having a tooth for engaging said notches, a pair of screws for holding said spring upon said head, said screws having convergent keyways, and a wedging-key driven between said screws in engagement with said keyways, and bent up at its smaller end.

13. The combination of two stems, a turnbuckle threaded to one and connected to the other, and a spring-detent operating between said turnbuckle and one of said stems.

In witness whereof I subscribe my signature in presence of two witnesses.

EDWARD R. HEWITT.

Witnesses:
FRANK S. OBER,
WALDO M. CHAPIN.